United States Patent [19]
McKee, Jr.

[11] 3,739,743
[45] June 19, 1973

[54] BREADING MACHINE APPARATUS
[76] Inventor: Lloyd Dale McKee, Jr., 1816 Dallas, Wichita, Kans.
[22] Filed: Aug. 25, 1970
[21] Appl. No.: 66,755

[52] U.S. Cl. ................................ 118/19, 118/418
[51] Int. Cl. .......................... A23g 3/26, A23l 1/31
[58] Field of Search ................ 107/1 B, 7 A, 7 R, 107/27 R, 43, 52; 118/417, 418, 19; 287/103 A

[56] References Cited
UNITED STATES PATENTS

| 1,577,856 | 3/1926 | Wingert | 287/103 A |
| 1,718,418 | 6/1929 | Hatch | 118/19 |
| 1,881,549 | 10/1932 | Hatch | 118/19 |
| 2,897,776 | 8/1959 | Black et al. | 118/19 X |
| 3,063,843 | 11/1962 | Hashimoto | 118/19 UX |
| 3,394,677 | 7/1968 | Taylor et al. | 118/19 X |
| 3,438,353 | 4/1969 | Pellegrini | 118/19 |
| 3,469,561 | 9/1969 | Gordon | 118/19 X |
| 1,012,877 | 12/1911 | Mahan | 107/43 X |
| 1,315,665 | 9/1919 | Hamilton | 107/43 X |
| 2,577,433 | 12/1951 | Robb | 107/1 B X |

Primary Examiner—John P. McIntosh
Attorney—Phillip A. Rein

[57] ABSTRACT

This machine relates to a breading machine apparatus operable to receive food products therein for breading the same on rotation of a product support assembly by a power means. The product support assembly includes a container drum assembly having a basket assembly therein. The basket assembly is operable to receive the food product while it maintains spaces therein for the breading material and constructed so as to agitate the food product on rotation of the container drum assembly.

7 Claims, 9 Drawing Figures

Patented June 19, 1973 3,739,743
2 Sheets-Sheet 1
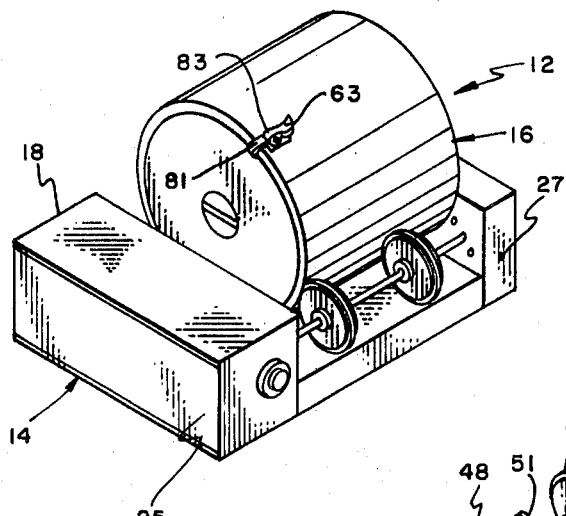
FIG. 1
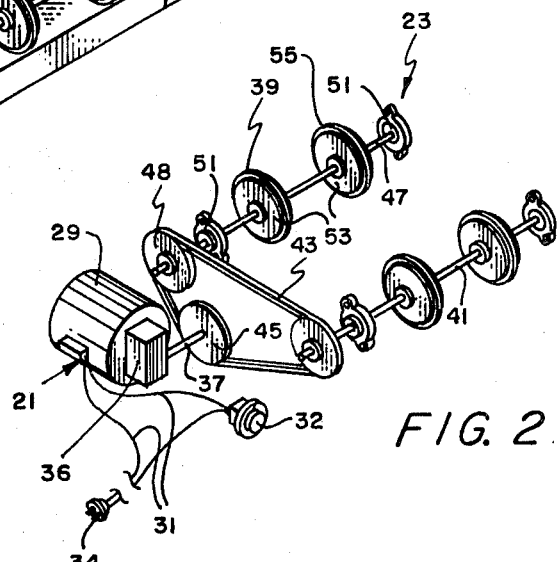
FIG. 2
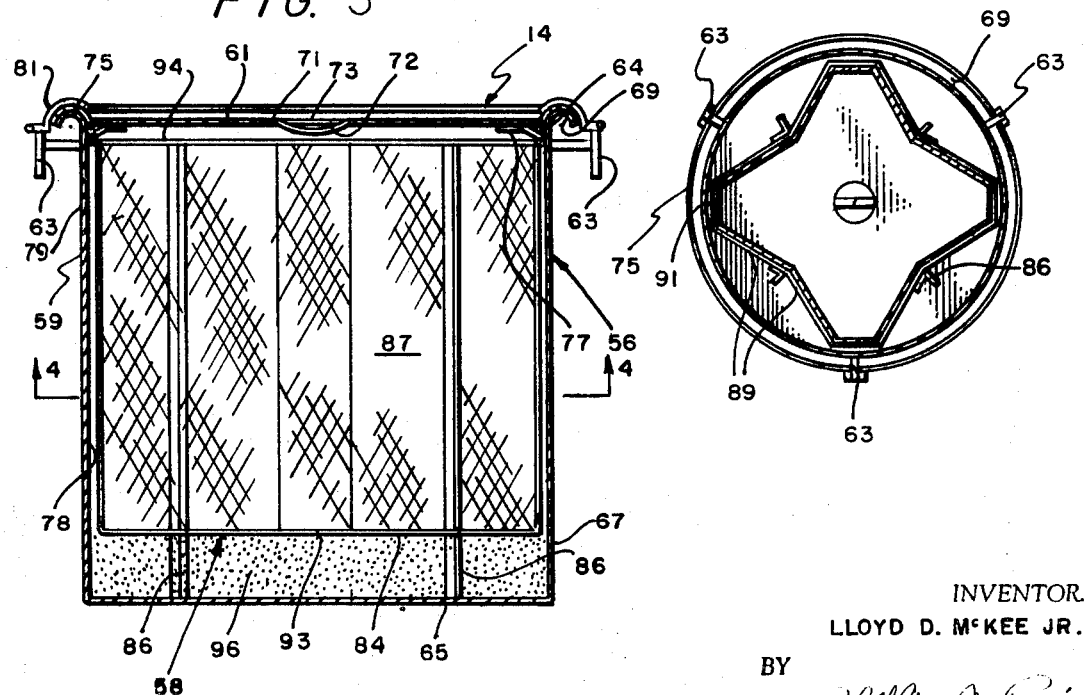
FIG. 3
FIG. 4
INVENTOR.
LLOYD D. McKEE JR.
BY
ATTORNEY

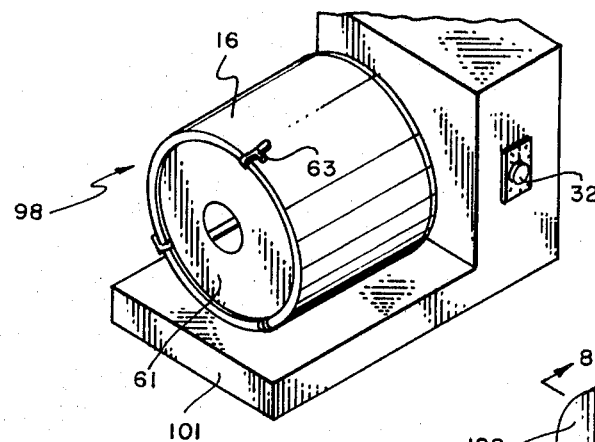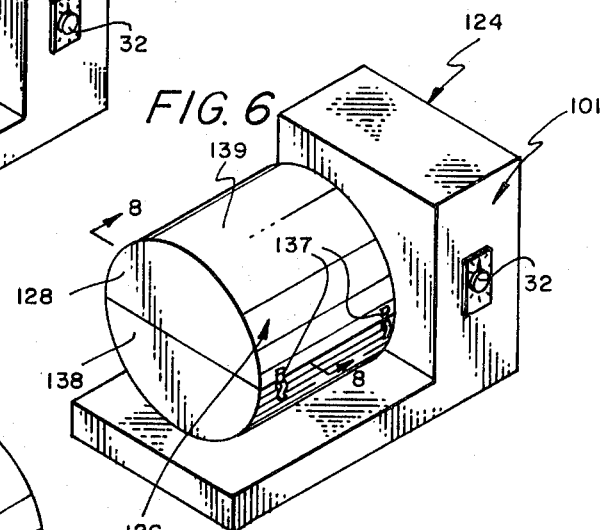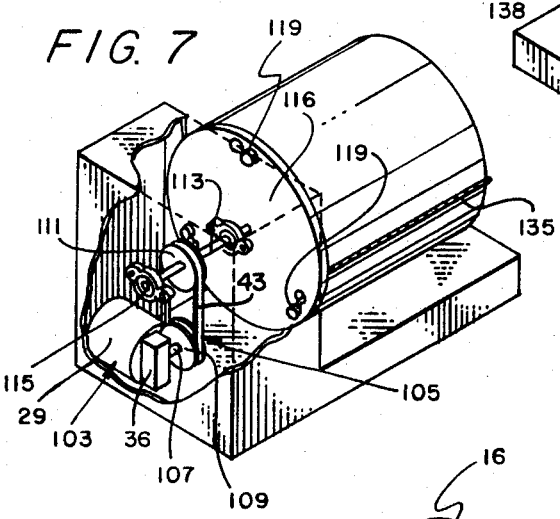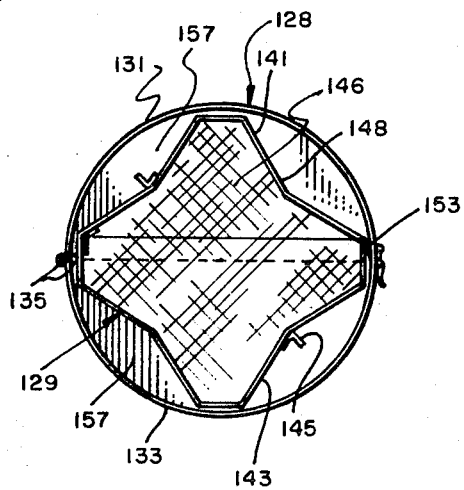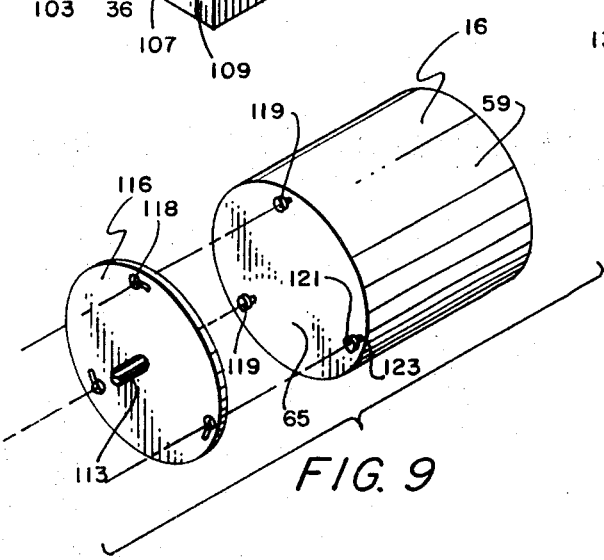

BREADING MACHINE APPARATUS

Numerous types of structures are known to the prior art being powered coating machines but many are very complex, expensive to manufacture, and difficult to clean and maintain. Additionally, the prior art devices are not provided with a new and novel removable product support assembly with the cooperation of the elements within a basket assembly so as to achieve the necessary and unique agitation of the food products therein.

In one embodiment of the breading machine apparatus of this invention, a friction drive breading machine apparatus is provided including a main support housing assembly with a product support assembly rotatably mounted thereon. The support housing assembly includes a power and control means operably connected to a transmission means to provide the power to drive the product support assembly. The power and control means includes a motor member powered from a control switch mounted in conductor members so as to rotate a drive shaft member driven from a gear box. The transmission means includes a pair of drive assemblies interconnected through a drive belt to a primary drive pulley secured to the drive shaft member. Each drive assembly includes an elongated support shaft having opposite ends rotatably mounted in stationary support bearings and a mid portion having a pair of spaced drum drive pulleys adapted to contact and rotate the product support assembly. The product support assembly includes a container drum assembly having a basket assembly mounted therein. The container drum assembly includes a main drum member having a lid member releasably connected thereto through latch members with a gasket member sandwiched therebetween to maintain any fluid and material therein. The drum member is generally a cylindrical shape adapted to have an outer surface contact the drive pulleys of the pair of drive assemblies for rotation thereof. The basket assembly includes a main basket member of irregular shape having upright support angles secured thereto. The basket member is provided with a plurality of inclined side wall members secured to a bottom wall. The support angles extend below the bottom wall of the basket member and operate to provide a spacing for receiving breading material therein when the basket assembly is placed in an upright condition and operates on rotation about its longitudinal axis to agitate the breading material to cause sufficient turbulence to achieve the desired breading feature.

A second embodiment of this invention includes a positive drive breading machine apparatus having a support housing assembly with the product support assembly mounted therein. The product support assembly is different in that one end of the drum member is provided with a plurality of laterally extended lug members adapted to be cooperatively engaged with an anchor plate which is adapted to be rotated through connection to the transmission means. In this case, the transmission means has been simplified whereupon only a drive pulley is interconnected by a belt member to a driven pulley secured to a support shaft which has opposite ends mounted in bearing members. The outer end of the driven pulley is connected to the anchor plate for rotation thereof. The drum product support assembly can be easily removed by hand rotation thereof in the opposite direction of normal rotation as the lug members are mounted within key hole slots in the anchor plate.

In a third embodiment of the invention, a positive drive, side open, breading machine apparatus is provided having a support housing assembly with a product support assembly mounted thereon. In this case, the product support assembly and anchor plate is substantially identical to that described in the second embodiment except that the drum member is formed in two half sections having the laterally extended lug members adapted to cooperate with key hole slots in the anchor plate as previously described. One elongated side is provided with spaced hinge members and the opposite side is provided with spaced latch members so that the apparatus can be opened on swinging movement of a half section. A new basket assembly is provided having irregular shaped side walls and provides a cage-like structure hinged on one side and formed in half sections. A laterally extended strap member is provided to contact the drum member when in the closed condition operable to maintain the basket member in the closed condition during rotation.

One object of this invention is to provide a new and novel breading machine apparatus to overcome the aforementioned disadvantages of the prior art structures.

Another object of this invention is to provide a new and novel friction drive breading machine apparatus provided with a product support assembly which can be readily mounted upon a support housing assembly for rotation thereof to provide for the effective and efficient breading of products contained therewithin without requiring manual labor.

Still one further object of this invention is to provide a breading machine apparatus having transmission means operated through a control switch to rotate a support drum member at the desired rotational speed to achieve the efficient mixing of the material therewithin.

Still another object of this invention is to provide a breading machine apparatus having a main support housing and a container structure connected through an anchor plate and cooperating lug bolt members on one end of the container structure to rotate the same about a horizontal axis.

A further object of this invention is to provide a breading machine apparatus having a new and novel basket assembly thereon so shaped and designed as to provide for the most efficient and effective mixing of the breading and products therewithin and constructed as to allow separation of the excessive breading material therefrom when in an upright, unload condition.

One other object of this invention is to provide a breading machine apparatus which is power operated; easily controlled as to desired rotational speed; easy to attach and detach for loading and unloading purposes; substantially maintenance free; and economical to manufacture.

FIG. 1 is a perspective view of the friction drive breading machine apparatus of this invention;

FIG. 2 is a fragmentary schematic diagram illustrating the transmission means including the power and control means for the friction drive breading machine apparatus of this invention;

FIG. 3 is an enlarged sectional view taken along a central, vertical plane of a product support assembly of the friction drive breading machine apparatus of this invention; with the support assembly in an upright position for loading; and FIG. 4 is a sectional view taken along line 4—4 in FIG. 3;

FIG. 5 is a fragmentary perspective view similar to FIG. 1 illustrating a second embodiment being a positive drive breading machine apparatus of this invention;

FIG. 6 is a perspective view similar to FIG. 5 of a third embodiment being a positive drive, side open, breading machine apparatus of this invention;

FIG. 7 is a view similar to FIG. 5 having the third embodiment rotated 180° about a longitudinal axis and portions thereof broken away to illustrate the transmission means;

FIG. 8 is a sectional view taken along line 8—8 in FIG. 6 illustrating only the product support assembly of the positive drive, side open breading machine apparatus of this invention; and FIG. 9 is an exploded view of a portion of the positive drive breading machine apparatus illustrating the connecting means between a support housing assembly and a product support assembly.

The following is a discussion and description of the preferred specific embodiments of the new breading machine apparatus of this invention, such being made with reference to the drawings whereupon the same reference numerals are used to indicate the same or similar parts and/or structure. It is to be understood that such discussion and description is not to unduly limit the scope of the invention.

Referring to the drawings in detail and in particular FIG. 1, one embodiment of a breading machine apparatus of this invention, indicated at 12, is shown in the operating or mixing condition. This embodiment is known as the friction drive breading machine apparatus 12 including a support housing assembly 14 with a product support assembly 16 rotatably mounted thereon.

The support housing assembly 14 includes a main housing means 18 adapted to receive and contain a power and control means 21 operably connected to a transmission means 23. The housing means 18 is preferably constructed of stainless steel and provided with a motor control section 25 integrally connected to an L-shaped container support section 27. In this instance, the support section 27 is operable to receive the product support assembly 16 thereon for rotation as will be explained.

The power and control means 21 includes a motor member 29 interconnected through conductor members 31 to an on-off speed control switch 32 which, in turn, is connected to an outlet plug 34 which may be mounted in a conventional 110 volt receptacle. The motor member 29 is provided with a gear box member 36 secured to a drive shaft (not shown) in order to reduce the normal speed of the motor member 29 so as to turn at a controlled speed an output shaft 37 from the gear box member 36. The transmission means 23 includes a pair of spaced drive assemblies 39 and 41 interconnected by a common endless belt member 43 which, in turn, is engageable with a drive pulley 45 secured to the outer end of the output shaft 37.

As each drive assembly 39 and 41 is substantially identical, only one need be described in detail. The drive assembly 39 includes an elongated support shaft 47 having a driven pulley 48 mounted on one end adapted to receive the belt member 43 thereabout for rotating the support shaft 47. Additionally, the drive assembly 39 includes a pair of spaced support bearing members 51 having the support shaft 47 rotatably mounted thereon with the bearing members 51 rigidly mounted on the support housing assembly 14 and a pair of spaced friction drive rollers 53 secured to the support shaft 47. The friction drive rollers 53 are provided an outer groove and a mid portion adapted to receive a rubber member 55 to contact the product support assembly 16 for rotation as will be explained. It is seen that the interconnection of the drive pulley 45 and the driven pulleys 48 with the belt member 43 operates to rotate the support shaft 47 in the same direction. Additionally, the on-off control switch 32 is operable to regulate the speed of the motor member 29 and resultant driving force of the transmission means 23.

The product support assembly 14 includes a main container drum assembly 56 havinG a basket assembly 58 mounted therein. The container drum assembly 56 includes a drum member 59 having a lid member 61 connected thereto through a plurality of latch members 63 with a gasket member 64 therebetween for sealing purposes.

As shown in FIG. 3, the drum member 59 is preferably constructed of a stainless steel material and provided with a bottom wall 65 with integral upright vertical circular wall 67 with upper edge curved outwardly to form an edge section 69 to receive the lid member 61 thereagainst. The lid member 61 is provided with a main body 71 and a central indented section 72 with a grip portion 73 for lifting purposes. An outer peripheral edge of the lid member 61 is formed with a curved sealing section 75 adapted to be engageable with the edge section 69 of the drum member 59.

The gasket member 64 is attached to the bottom surface of the lid member 61 through a circumferential rim member 77 so that the gasket member 64 is adapted to contact inner vertical, circular wall 78 of the drum member 59 when in the clamped condition to prevent leakage of material therefrom.

The plurality of latch members 63, preferably three, are rigidly secured to an outer surface 79 of the drum member 59 and close to an upper edge thereof. Each latch member 63 includes an outer latch section 81 operable to contact the upper surface of the sealing section 75 of the lid member 61. The latch members 63 are each provided with a release handle 83 so that the same is readily clamped in the closed and then moved to the release condition as required.

As shown in FIG. 3, the basket assembly 58 when in the vertical position for loading and unloading includes a main, irregularly shaped basket member 84 having upright, spaced support angle iron members 86 secured thereto. The basket member 84 is constructed of a heavy wire mesh material so as to maintain the food product therewithin to allow a flour or breading material to move therethrough. The basket member 84 is provided with irregularly shaped side walls 87 and having wall sections 89 forming an angle of 150° between each other and joined by end wall sections 91. More particularly the basket member 84 includes a main bottom wall 93 having the irregular side walls 87 secured thereto and a rim 94 around an upper portion of the side walls 87. The angle iron members 86, of which there are at least three but preferably four for stability, are extended below the bottom wall 93 of the basket member 84 and adapted to rest on the bottom wall 65 of the drum member 59 when in the upright condition as shown in FIG. 4. In this position, the breading material falls downwardly into a storage space 96 so that the basket member 84 can be removed with only the food product therein.

In another embodiment of this invention as shown in FIGS. 5 and 9, a positive drive breading machine apparatus 98 is provided having the product support assembly 16 mounted on a support housing assembly 101. The support housing assembly 101 includes a power and control means 103 operably connected through a transmission means 105 for rotating the product support assembly 16. The power and control means 103 includes the motor member 29 (FIG. 7) operably connected through the gear box 36 to a drive shaft 107 and a drive pulley 109. The transmission means 105 includes a belt member 43 connected to the drive pulley 109 and a driven pulley 111. The driven pulley 111, in turn, is secured to an output shaft 113 having spaced portions thereof rotatably mounted in bearing members 115 secured to front and back vertical walls of the support assembly 101 and an outer end secured to a rotatable anchor plate 116 which is connected to the product support assembly 16.

More particularly, the anchor plate 116 is of a generally circular shape as shown in FIG. 9 having spaced key way slots 118 thereon adapted to receive anchor bolt members 119 which are laterally extended from the wall 65 of the drum member 59 of the product support assembly 16. The use of the anchor bolt members 119 is the only change in the product support assembly 16 as previously described. It is seen that the anchor bolt members 119 are provided with enlarged heads 121 integral with a connecter section 123 whereupon the heads 121 will pass through a large section of the key way slots 118 but not in through the smaller section so as to provide a means of connecting the product support assembly 16 to the support housing assembly 101 and rotating the same on operation of the on-off control switch 32. It is noted that the product support assembly 16 includes the identical lid member 61 and basket assembly 58 as previously described in the first embodiment.

In a third embodiment of this invention as shown in FIGS. 6, 7, and 8, a positive drive, side open, breading machine apparatus 124 is provided having the support housing assembly 101 substantially identical to that previously described for the second embodiment and having a product support assembly 126 mounted thereon.

In this embodiment, the product support assembly 126 includes a container drum assembly 128 having a basket assembly 129 mounted therein. The container drum assembly 128 is constructed of two identical drum half sections 131 and 133 interconnected along an elongated edge by hinge members 135 and having a pair of latch members 137 on the opposite edge to clamp the same in a closed condition as shown in FIG. 6. Each drum half section 131 and 133 includes opposed semi-circular end walls 138 joined by a main body 139 to form an enclosed structure in the closed condition. It is obvious that a gasket member (not shown) can be supplied about the rectangular openings of the drum half sections 131 and 133 to positively seal same in the closed condition. It is also seen that the drum half sections 131 and 133 are provided with the laterally extended anchor bolt members 119 to be co-operatively engaged with the key hole slots 118 in the anchor plate 116 in the rotatable condition as shown in FIG. 7. The bolt members 119 may be only placed on the drum half section 133 so that the drum half section 131 can be moved to the open condition without removal from the anchor plate 116 for high production.

As shown in FIG. 8, the basket assembly 129 includes a pair of half section basket members 141 and 143 also interconnected along an edge as by hinge members 135 and having angle iron members 145 connected along at least two sides for added rigidity. The basket sections 141 and 143 are each provided with end walls 146 interconnected by integral side walls 148 to provide an irregularly shaped structure so as to provide spaces indicated at 157 whereupon the breading material can rest when in the non-rotating condition for removing or adding the food products. Additionally, a laterally extended, flexible closure strap 153 is provided with the drum half section 131 when in the closed condition as shown in FIG. 8 to maintain the basket members 141 and 143 in the closed condition during rotation.

In the use and operation of the friction drive breading machine apparatus 12, it is obvious that the first step is to place the drum member 59 in the upright condition whereupon flour or breading material and the like can be added thereto and food products may be placed within the basket member 84. Next the basket member 84 is placed within the drum member 59 while in the upright condition of FIG. 4 and the lid member 61 is securely clamped thereon so as to seal the same against leakage through the use of the gasket member 64. Thereupon, the product support assembly 16 is rotated substantially 90° about a vertical axis and placed between the spaced drive assemblies 39 and 41 of the transmission means 23 with the drive friction rollers 53 in contact therewith as shown in FIG. 1. The on-off and control switch 32 is then actuated after the power outlet plug is placed within an output receptacle whereupon power is supplied to the motor member 29. It is seen that the motor member 29 operates through the gear box 36 and drive pulley 45 and belt member 43 to then rotate the support shafts 47 to cause subsequent rotation of the product support assembly 16. It is seen that the on-off and control switch 32 can be regulated to adjust the rotational speed of the transmission means 23 which may be desirable depending on the size and type of food product then being breaded. It is obvious that the on-off and control switch 32 may have a timer built therein to automatically cease power to the motor member 29 after a specific time period.

It is noted that the basket member 84 having the shaped side walls 87 in combination with the upright angle members 86 operates to cause and continue movement of the food product within the basket member 84 and agitation of any breading material or flour which may be against the side walls 67 of the drum member 59.

After sufficient agitation, it is obvious that the on-off and control switch 32 is moved in the "off" condition to stop rotation of the product support assembly 16 and the same is removed therefrom and placed in the upright condition as shown in FIG. 4. In this condition, the flour or breading material therein would naturally flow under the force of gravity through the bottom wall 93 of the basket member 84 into the material storage space 96. Next, the lid member 61 is removed on releasing the latch members 63 whereupon the basket assembly 58 with its now breaded food product is removed therefrom for further processing.

On operation of the second embodiment being the positive drive breading machine apparatus 98 as shown in FIG. 5, the operation is substantially identical to the first embodiment except that the operator attaches the product support assembly 16 to the anchor plate 116 through cooperating engagement of the key way slots 118 and anchor bolt members 119 which secures the same thereto when rotating in the proper direction. After sufficient breading action, the product support assembly 16 is rotated slightly, opposite the direction of normal rotation, to release the same from the key way slots 118 whereupon the basket assembly 58 may be removed therefrom.

In the third embodiment being the positive drive, side open, breading machine apparatus 124 as shown in FIGS. 6 and 7, it is to be noted that the product support assembly 126 is loaded in the previously mentioned manner and secured to the anchor plate 116 as described in the second embodiment. The operation of this embodiment is mainly different in that both the drum assembly 128 and the basket assembly 129 are formed in half sections whereupon the food product after having been breaded may be removed on opening of the drum assembly 128 and the basket assembly 129 not requiring the complete detachment thereof from the support housing assembly 101. This is desirable in certain cases of high production and does not require substantial lifting of the product support assembly 126 except infrequently for maintenance and cleansing purposes.

It is seen that the breading machine apparatus of this invention provides a structure which is easily usable for breading purposes having a new and novel basket assembly therewithin to provide for the agitation of the food product and mixing with flour or breading material. Additionally, it is seen that the breading machine apparatus provides a means for readily loading and unloading food products therewithin and a product support assembly readily moved to the attached and detached conditions for loading and unloading purposes in a most efficient and effective manner. Additionally, the breading machine apparatus is provided with basically simple elements for ease of usage and cleansing which is extremely desirable when dealing with food products and the required health and sanitary conditions and regulations. The breading machine apparatus of this invention is economical to manufacture; simple to use; substantially maintenance free; and provides a much needed structure in the food industry to provide for automatic breading of food products in a most efficient and effective manner.

While this invention has been described in conjunction with preferred specific embodiments thereof, it will be understood that this description is intended to illustrate and not to limit the scope of the invention, which is defined by the following claims.

I claim:

1. A machine apparatus adapted to receive and mix food products and breading material therein, comprising:
   a. a support housing assembly having a power means,
   b. a product support assembly having a container drum assembly with a basket assembly contained therein, said container drum assembly placed in contact with said support housing assembly for rotational movement by said power means about a longitudinal axis, and
   c. said basket assembly having a plurality of interconnected walls about said axis to define a chamber for containing said food products, said plurality of walls including a plurality of end wall sections adjacent said container drum, the adjacent end wall sections being joined by V-shaped side walls with the apex of said V-shaped pointing inwardly toward said axis whereby to agitate said food products therein on rotation of said container drum assembly.

2. The machine apparatus as described in claim 1;
   a. said container drum assembly including a main cylindrical drum member having a lid member secured thereto with a plurality of latch members and having a gasket member sandwiched therebetween to seal said container drum assembly, and said lid member against an open end of said basket assembly in said drum member to maintain food products therein,
   b. said latch members moveable from the unlatch to latched condition to securely clamp an outer peripherial rim section of said lid member against a like peripherial portion of said drum member to sandwich said gasket member therebetween and releasably seal the same so that the products contained therein will not leak therefrom when in usage, and
   c. said power means including a motor member connected through a transmission means to a pair of spaced friction drive assemblies, and
   d. said friction drive assemblies each having spaced friction drive roller members to contact the outer surface of said drum member for rotating the same at predetermined speed for the agitation of the food product and breading material thereon.

3. A machine apparatus as described in claim 1,
   a. said basket assembly including a main basket member having said interconnected walls secured to a bottom wall, all constructed of a mesh material so as to receive the food products therein but allow the breading material to pass therethrough and having a plurality of elongated angle iron members secured to said V-shaped walls,
   b. said angle iron members extended a substantial distance below said bottom wall of said basket member so as to contact a bottom wall of said container drum assembly when in an upright condition so that the food product and breading material are separated by gravity flow through said bottom wall of said basket member, and
   c. said angle iron members to contact the breading material when in a rotating usage condition about a horizontal axis so as to further agitate the breading material therein.

4. A machine apparatus as described in claim 1:
   a. said power means including a control means operably connected through an input conductor lines to a motor member for rotation of the same, said control means to energize said power means on and off and regulate the speed thereof,
   b. said power means including a transmission means having said motor member connected to a drive pulley and through a belt member to a driven pulley which, in turn, mounted on a driven shaft mounted within bearing members in said support housing assembly, and one end of said driven shaft is connected to a circular anchor plate, c. said anchor plate extended outwardly of said support housing assembly and re'easably connected to said container drum assembly for rotation thereof about a horizontal axis, and d. said anchor plate member having a plurality of key way slots therein to receive cooperating anchor lug bolt members extended laterally from a bottom surface of said container drum assembly to rigidly connect same for rotation in one direction but the container drum assembly can be readily released therefrom by rotation in the opposite direction of normal rotation for loading and unloading purposes.

5. A machine apparatus as described in claim 4, a. said container drum assembly having a drum member formed of drum half sections with one longitudinal edge of said half sections interconnected by hinge members and the opposite side thereof releasably connected by latch members in the closed condition, and b. said basket assembly formed of half sections, at least one of said drum half sections of said container drum assembly provided with said laterally extended anchor lug bolt members to be releasably connected to said anchor plate member rotatably driven by a said power means.

6. A machine apparatus as described in claim 5, a. said basket assembly of said half sections having elongated edges of one side secured by a hinge member and the opposite sides engage said drum half sections in the closed condition, whereby said drum half section may be raised to the open condition and said half section of said basket assembly may also be raised to the open condition so as to remove the food products therewithin not requiring the removal of the said product support assembly for unloading and loading purposes.

7. The machine apparatus described in claim 6;

a. one of said half sections of said basket assembly opposite said hinge member having a laterally extended flap member to engage the inner surface of said container drum member when in a closed condition to hold said basket assembly in a closed condition to maintain the food products and breading material therewithin; and b. said V-shaped side walls having an angle of 150° therebetween so as to provide sufficient space for the separation of the food product and breading material, allowing the breading material to move downwardly externally of said basket assembly when in the non-rotating condition.

* * * * *